Patented Nov. 10, 1942

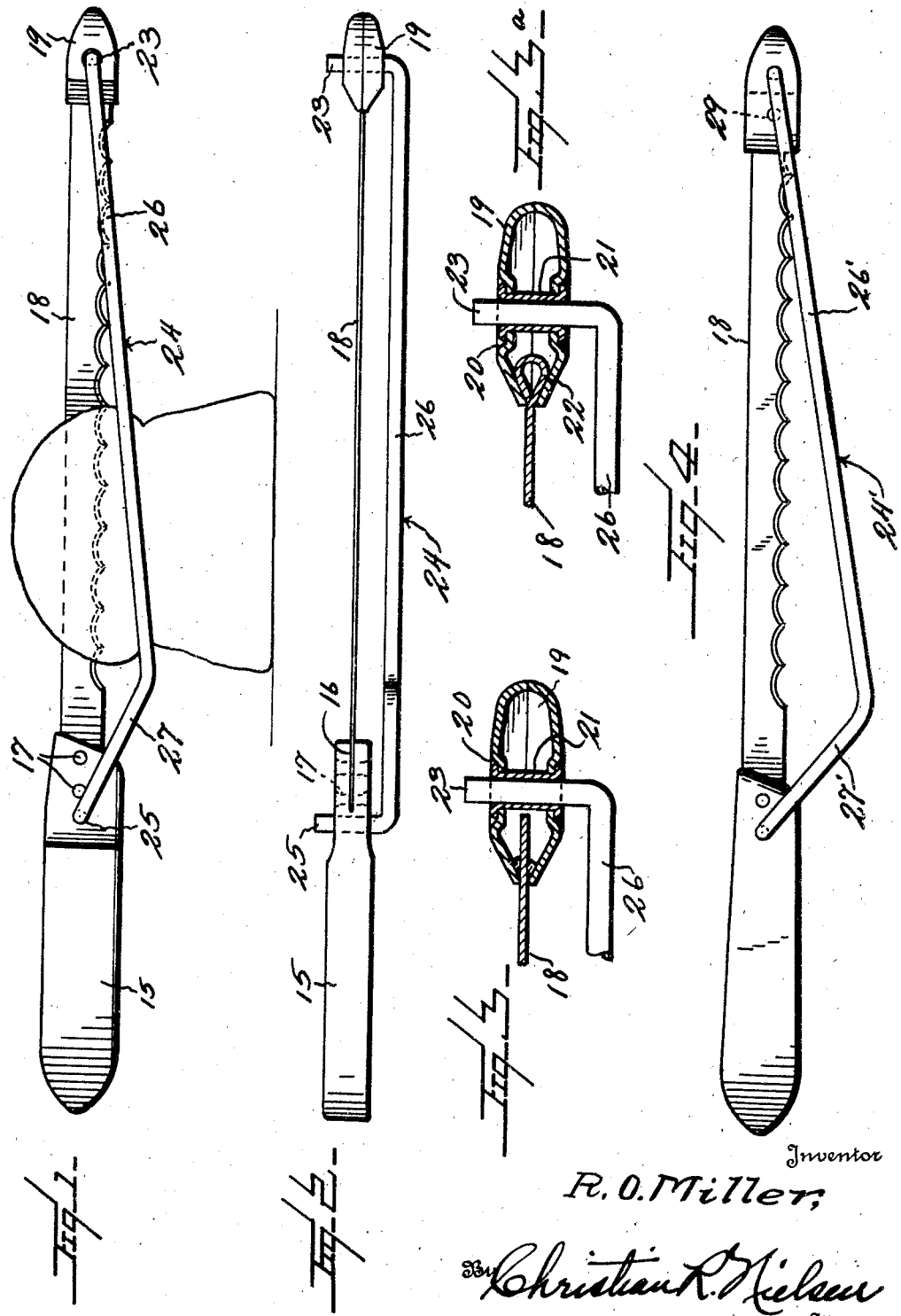

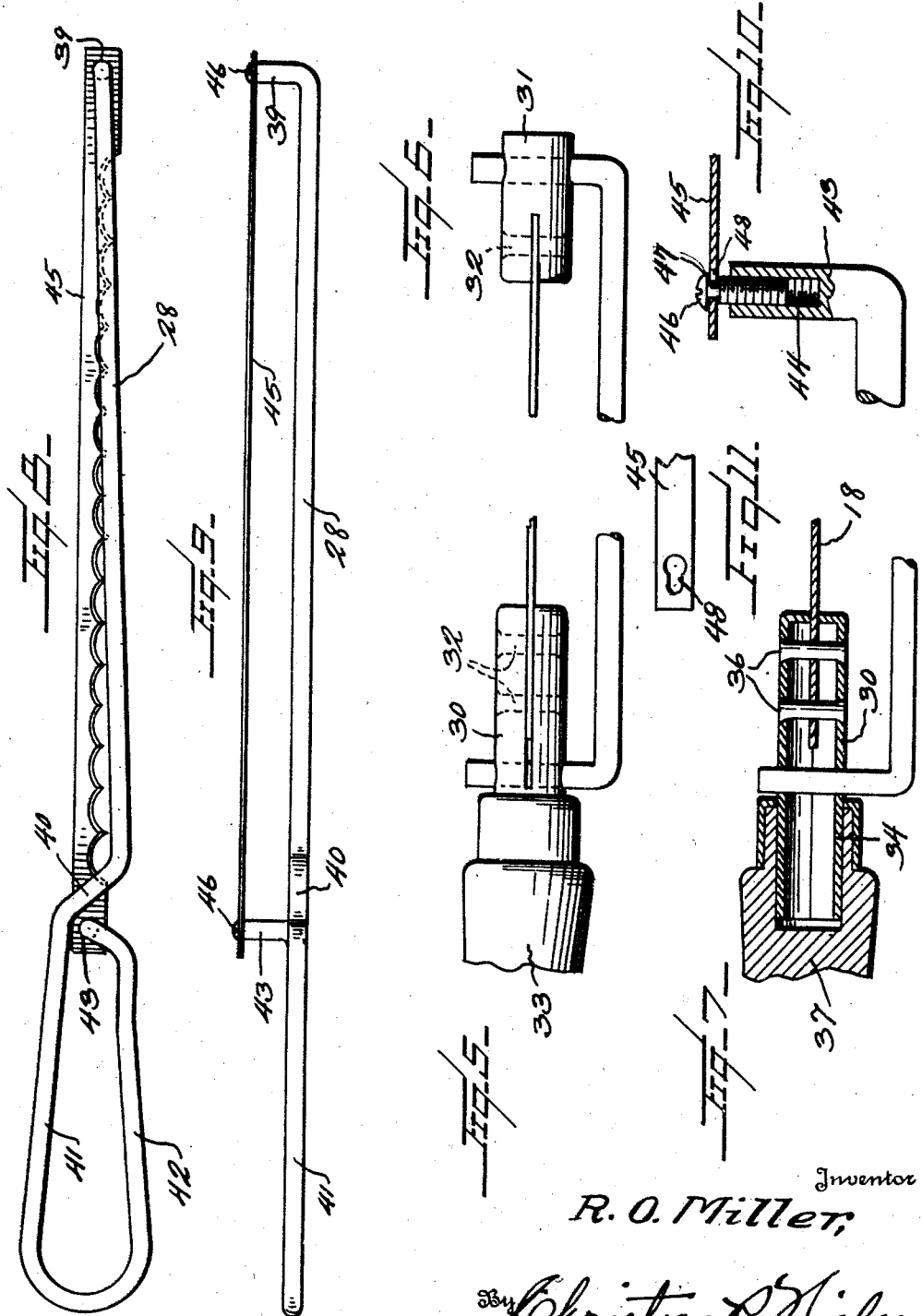

2,301,737

UNITED STATES PATENT OFFICE 2,301,737

BREAD SLICING KNIFE

Rudolph O. Miller, Valley City, N. Dak.

Application May 11, 1942, Serial No. 442,502

4 Claims. (Cl. 30—283)

The invention has for an object to present an improved construction in a knife suitable for cutting bread, cake, and the like, which will be extremely light, very low in cost, and will have an unusually long life, as compared to ordinary knives or bread slicing knives. A further aim is to present a novel means for governing the thickness of a slice cut with the implement. A still further object is to present a knife construction of novel nature in which the parts coact to perform combined functions and serve a number of separate functions in novel ways.

It is an important aim of the invention to present a novel mounting for a flexible conventional bread slicing blade such as used in bread slicing machines, so that, owing to the large quantity production of such blades, my knife may be produced at an extremely low cost and in an extremely light weight. A further important aim of the invention is to present a combined structure and guard, which in addition to serving as a guard and stretcher, will also regulate the thickness of the slice cut.

A further important aim is to provide a novel mounting in the guard, whereby adjustment may be manually made at will, for varying the thickness of the slice to be cut.

Additional objects, advantages and features of invention reside in the construction, arrangement and combination of parts involved in the embodiment of the invention, as will be more readily understood and apparent from the following description and accompanying drawings, wherein Figure 1 is an elevational view of the knife engaged in a loaf of bread as used in cutting a slice from the loaf, Figure 2 is a top view of Figure 1, Figure 3 is a horizontal section of the blade tip and guide-structure mounting, Figure 3a is a modified form of the mounting, Figure 4 is a modification of the knife with the blade tip mounting made in wood, Figure 5 is a top view of a modification of the blade in the handle, Figure 6 is a similar view of the blade tip mounting in the last mentioned device, Figure 7 is a further modification of the handle mounting for the blade, partly in section, Figure 8 is a side elevation of a modification of the knife showing a combined handle, guard, stretcher and blade mounting formed from one piece of round steel stock, Figure 9 is a top view thereof, Figure 10 is a detail of the mounting of the blade in the last described modification, enlarged, Figure 11 is a detail showing of the blade for the last form of the device.

Referring more particularly to the drawings, there is illustrated a knife comprising a handle 15, which is customarily formed of wood, and is provided at its forward end with a kerf or slot 16, in which there is set and secured by rivets 17 a conventional scalloped edge bread cutting blade 18, which is familiar in the art, being commonly used in bread slicing machines where a multiplicity of such blades are mounted in the operating frame by which the loaf is sliced into a multiplicity of slices simultaneously. This blade has secured at its extremity a tip 19, which may be formed in various ways, as will be hereinafter more particularly described, but in the present form, as may be seen clearly in Figure 3, is formed in two dished sheet metal blanks which are brought together with their inturned edges in alinement and abutment to form a hollow body, meeting in a plane coincident with the major plane of the blade. Each of the disk pieces is formed with a central recess in its outer surface, by pressing the metal inwardly thereof, and is apertured centrally of the recess 20, and the two parts are secured together by means of a hollow rivet 21 having its ends upset over the recessed portions of the top pieces. The blade is secured between the meeting edges of the two front pieces which may be slightly relieved to accommodate the blade while forming a snug joint at all other meeting edges of the pieces, and the blade may be further secured by means of solder, welding, or otherwise. It is preferably inserted and the hollow rivet 21 thereafter applied. In another form, the blade may be secured without the use of welding or the like, by forming an eye in the annealed end portion of the blade, as shown at 22 in Figure 3a. The insertion of the blade between the top parts and affixing of the rivets 21 will then permanently secure the blade in the slot.

The rivet 21 is of substantial diameter, so as to afford a good cylindrical bushing for the insertion of a rectilinear arm 23 formed on the outer end of a guide and stretcher 24, the opposite end of which is provided with a similar arm 25 inserted slidably through a proper opening in the handle 15 inwardly of the end of the blade. The guide is formed of simple round steel stock, which, in the present form of the device, may be approximately $\frac{3}{16}$ of an inch in diameter, although these proportions may be varied without affecting the functions of the invention essentially. The guide consists of a forward rectilinear bar or short portion 26 extending from the forward arm 23 rearwardly to a point a short distance forwardly of the handle, and slightly below the cutting edge of the blade, and from this point a diagonal rear bar portion 27 is continued integrally to the junction of the guide with the rear arm 25. It will be noted that these arms 23 and 25 are bent at right angles to the adjacent portion of the guide, so that these two arms extend in parallel relation, substantially, and are so spaced that they may be simultaneously inserted in the opening through the handle and in the hollow rivet 21 when slightly flexed, so that in the reaction of the guides, it maintains the blade 18 at a proper tension and in rectilinear form for normal uses.

In the form illustrated, the blade is formed with a conventional scalloped edge, it being customary to use in such blades stock having a width of approximately half an inch, although some blades are formed of three-eighths inch width, and the scallops may range in size from intervals of three-eighths inch or less to one-half inch or more. Blades with simple rectilinear edges or edges otherwise shaped may also be used alternatively. The thickness of the stock in such blades is commonly 26 gauge, although thicker or thinner materials may also be used in my invention.

In Figure 4 there is illustrated a modification of the invention in which the tip is formed of wood, having suitable contours, and formed with a kerf the same as the handle, the forward end of the blade being secured therein by a transverse rivet 29. This tip is transversely apertured to receive the forward arm 23 of the guide, as in Figures 1 to 3. The guide 24' in this instance, however, has the forward bar portion 26' extended downwardly at the rear below the blade a somewhat greater distance than in the form shown in Figures 1 to 3, the rear bar portion 27' extending upwardly therefrom a correspondingly greater distance in order to engage in the handle.

In Figures 5 and 6, there is illustrated a modification of the blade mounting in which each end of the blade is permanently attached to a piece of bar steel 30 and 31 respectively, at the handle and tip of the blade, the bar being split at the end suitably to receive the blade snugly therein, which may be secured by rivets 32 or otherwise, as found desirable. Both bar pieces are formed with transverse apertures immediately beyond the end of the blade, and a guard device and guide similar to the one 24 may be likewise engaged in these apertures. The bar 30 at the handle is elongated and suitably shaped to form a shank which may be set in the handle 33 in accordance with conventional practices in the insertion of shanks in handles, as is well understood.

In Figure 7 there is shown the modification of the handle mounting of the blade, in which a shank or ferrule 34 is formed from two opposed members stamped from sheet metal and having a shape to form, when assembled, a cylindrical shank with a closed forward end, the two pieces being secured together by means of rivets 36 engaged through the two and to the blade 18, which may otherwise conform to the construction previously described. The hollow shank 34 may be driven into the handle 37 and may be additionally secured therein in any conventional way, if desired. Similar practice may be followed in forming the tip mounting of the blade, which, in view of the nature of the article is not thought to require illustration.

In Figures 8 to 10, there is illustrated an extremely simplified construction of my article, in which the handle and guard and guide are formed in one piece, and the blade is simply attached to the extremities of the laterally turned arms. The handle and guard are formed from one piece of round steel stock, of suitable thickness, which is bent near its middle to form the outer bar portion 28 of this device, which corresponds to the bar 26 as to length and relation to the blade, and at its forward extremity has a lateral arm 39, arranged at right angles to the bar 28. At the inner end of the bar 28, the material is bent upwardly to form a diagonal part 40, which corresponds to the inner bar portion 27, before described, and at a level slightly above that of the blade, the piece is bent downwardly, so as to extend longitudinally nearly or quite horizontal or parallel to a geometrical projection of the blade for a suitable distance, so as to form the upper side of a handle 41. At the rear part the steel stock is bent downwardly and thence forwardly again, spaced from the upper handle part 41 suitably, and slightly convergent forwardly theretoward, so as to form the lower handle portion 42. Adjacent the diagonal portion 40, the end portion of the steel stock is bent upwardly and extended a short distance, stopping short of the diagonal part and upper part of the handle, and the extremity is then bent at right angles to the plane of the handle, so that as to form the inner arm 43, this arm and the arm 39 then extending in parallel relation to each other, as shown.

Each extremity of the round steel piece in the device is longitudinally bored and threaded, to a considerable depth, as at 44, and for mounting the blade 45 in this device, screws 46 are engaged through respective ends of the blade and engaged in respective bores 44, which may extend the full length of the respective arms 39 and 43. The spacing of the blade and the guard and guide arm 28 may be effected by screwing the screws 46 inwardly or outwardly, as the case requires, the blade being retained closely adjacent the head of the screw at each end. As shown in Figures 10 and 11, the screw may have a reduced portion 47 next adjacent the head for engagement with the aperture of the blade. The ends of the blade may be formed with a pear-shaped slot 48, the larger end of which is adapted to receive the head of the screw freely therethrough, but the reduced portion of which is arranged to engage in the reduced part 47 for retention of the blade against movement longitudinally of the screw in either direction.

It will be understood that in the forms of knives shown in Figures 1 to 7, the setting of the guard devices with respect to the cutting blades may be varied by merely moving the latter transversely with respect to the blade to accommodate different thicknesses of cut through the loaf of bread.

While I have disclosed and described my invention with great particularity, in its best form as thus far developed, it will nevertheless be understood that this is purely exemplary, and that various changes in construction, arrangement and combination of parts, sizes and proportions of parts, substitution of materials and mechanical equivalents, may be made without departing from the spirit of the invention, as more particularly set forth in the appended claims.

I claim:

1. A knife of the character described comprising a base mounting, a flexible blade secured therein, and a tip mounting at the extremity of the blade, and a guard and guide bar having lateral parallel rectilinear arms at its extremity engaged slidably transversely through the base mounting and tip mounting, for the purposes described.

2. A knife of the character described, comprising a thin flexible blade, a handle secured to one end thereof and a tip element at the extremity of the blade, said blade and tip element each having a transverse aperture therethrough, and a combined guard, guide and blade tensioning member consisting of a bar of resilient metal having lateral parallel arms complemental to respective apertures of the handle and tip element.

3. A knife of the character described, comprising a guard and handle and tensioning member formed of a bar of resilient metal having a forward rectilinear portion, the extremity of the latter being bent at right angles to form a blade mounting arm, the inner part of said bar being bent upwardly at the base of said rectilinear part and thence rearwardly to form an upper handle portion, and being bent downwardly and forwardly to form a handle portion spaced from the upper handle portion, the adjacent extremity being then bent upwardly and then at right angles to the plane of said handle to form a rectilinear extremity parallel to the forward extremity, said arms being longitudinally bored from their extremities and interiorly threaded, and respective screws engaged therein, said blade being engaged revolubly upon said screws, for the purposes described.

4. The structure of claim 3, in which said screws have a reduced portion, and said blade has pear-shaped slots with reduced ends toward its extremities, to receive the head of said screws therethrough and for engagement of the reduced part of the slot in the reduced portion of said screws.

RUDOLPH O. MILLER.